Aug. 6, 1929.   J. P. PAULY   1,723,069
COFFEE PRODUCT AND PROCESS OF MAKING SAME
Filed Dec. 24, 1928

Inventor
John Peter Pauly
By Warren D. House
His Attorney

Patented Aug. 6, 1929.

1,723,069

UNITED STATES PATENT OFFICE.

JOHN PETER PAULY, OF KANSAS CITY, MISSOURI, ASSIGNOR TO MEASURE-RITE COFFEE COMPANY, OF KANSAS CITY, MISSOURI, A CORPORATION OF MISSOURI.

COFFEE PRODUCT AND PROCESS OF MAKING SAME.

Application filed December 24, 1928. Serial No. 328,121.

My invention relates to improvements in coffee products and process of making same.

This application is a continuation, in part, of an application for improvements in coffee products and processes of making same filed by me May 18, 1925, Serial Number 31,068.

One of the objects of my invention is to provide a coffee mixture that will permit of boiling of the coffee for a considerable period of time without imparting to it the usual bitter taste caused by boiling coffee, thereby enabling the full strength of the coffee to be extracted without injury to the flavor, and with the resultant saving in the amount of coffee used for a predetermined number of cups.

A further object of my invention is to provide a coffee cake or tablet, which may be handled and transported without breaking into fragments and which will not break up into loose grounds during the boiling operation in the coffee pot.

The novel features of my invention are hereinafter fully described and claimed.

In the accompanying drawing, which illustrates my improved coffee cake and an apparatus for making the same, Fig. 1 is a side view, partly in elevation and partly in vertical section, of my improved mold in which the coffee cakes are formed and baked.

Similar reference characters designate similar parts in the different views.

In the process of making my improved coffee cakes, coffee, browned and ground, egg white, and salt are mixed with an adhesive material, preferably in the form of a solution, and which may be a solution of gelatine, or a solution of glucose, or both of these solutions in proportions substantially as follows, avoirdupois measure:—

Ground browned coffee one pound, egg white three ounces, salt one quarter of an ounce, and gelatine one quarter of an ounce dissolved in two ounces of water, or glucose dissolved one half ounce in two ounces of water.

After these elements have been thoroughly mixed, the mixture is formed into cakes or tablets, preferably compressed, and then baked until the adhesive material in the cakes has hardened, which may require baking for eighteen to thirty-five minutes at a temperature between three hundred and twenty-five and four hundred and fifty degrees Fahrenheit. The cakes or tablets are then permitted to cool to atmospheric temperature, after which they may be used to make coffee in any of the methods followed, but preferably, by a method which includes boiling the coffee for a period of time, in order that the full strength of the coffee may be extracted.

Figure 1:
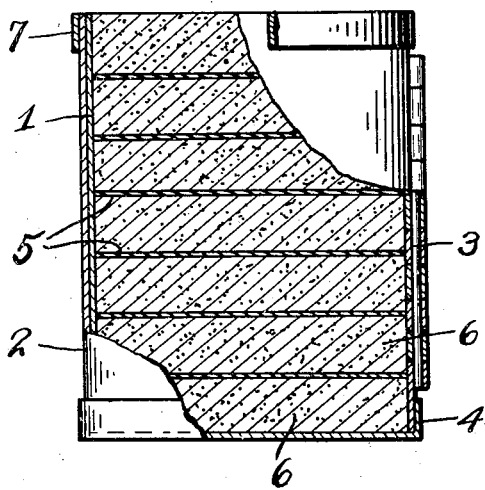
Figure 2:
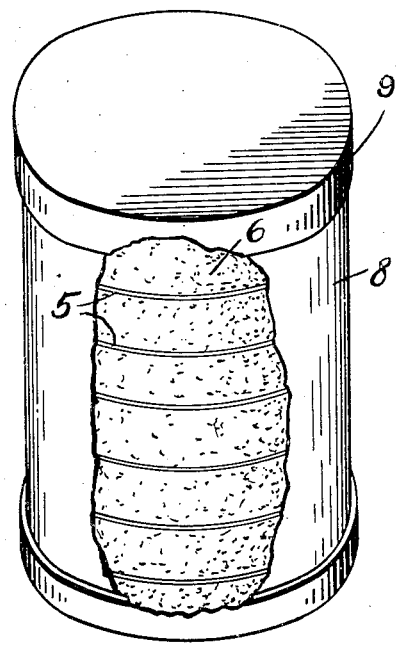
Fig. 2 is a perspective view of a plurality of the coffee cakes shown mounted in a carton in which they are stored and marketed, a portion of the carton being broken away.
Figure 3:
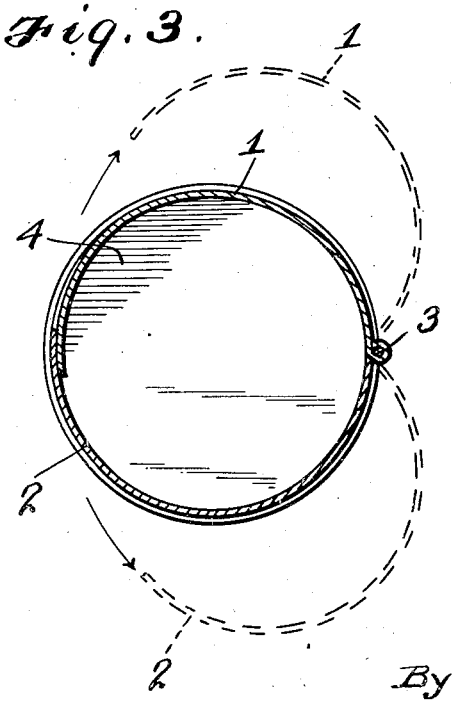
Fig. 3 is a horizontal section of the mold in which the cakes are formed and baked.
Figure 4:
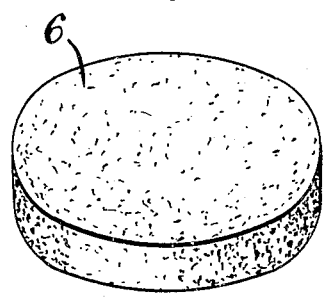
Fig. 4 is a perspective view of one of my improved coffee cakes.

In Figs. 1 and 3, is shown a mold of my invention, which is well adapted for preparing the coffee composition for molding and baking.

My improved mold preferably comprises the following described parts.

1 and 2 designate respectively two vertical hollow semicylindrical shells hinged together at one vertical set of edges by a pintle 3, and having their opposite edge portions overlapping, as shown in Fig. 3. A removable cap 4 is adapted to slip over the lower ends of the shells 1 and 2, when the latter are in the closed position shown in solid lines in Figs. 1 and 3.

A quantity of the coffee composition sufficient to make a predetermined number of cups of coffee is placed in the mold upon the cap 4, following which a separating disk 5, which may be a tin plate disk, is then placed in the mold upon the portion of the coffee composition therein, and has applied to it a plunger, not shown, by which the coffee composition is compressed to form a cake or tablet 6, of the desired density or thickness.

Another portion of coffee composition of the same amount as the first portion is then placed in the mold upon the bottom disk 5, following which a similar disk 5 is placed on the last named portion and is forced downwardly with the plunger to compress the last named portion in the same manner as the first portion was compressed.

Subsequent portions of coffee composition and separating disks 5 are placed in the mold and compressed, as before described, until the mold is filled.

A ring 7 may be placed around the upper end of the mold to prevent, in connection with the cap 4, the shells from spreading under the pressure applied in the compressing operation.

The filled mold is then placed in an oven having an approximate temperature as hereinbefore stated, and is permitted to bake at this temperature for approximately the length of time hereinbefore named. The top of the mold is left sufficiently open to permit of the escape of steam and vapor from the mold.

During the baking operation, the coffee cakes, being in the mold, are held thereby, and by the plunger hereinbefore referred to, from being expanded by the high heat to which they are subjected, thereby keeping the coffee grains tightly against each other, so that, when the baking heat has hardened the adhesive material connecting the coffee grains, the latter will be firmly held together, and will form a cake which will have its original form and bulk, and which will not crumble in handling or in shipment or storage. Thus the cake when it reaches the user's hands will be an integral body having the proper measured quantity of coffee with its flavor and strength retained.

After the baking operation, the mold with its contents is removed from the oven, the ring 7, cap 4 and plunger are removed and the shells 1 and 2 are swung to the open position, shown in dotted lines in Fig. 3.

The removed contents are then permitted to cool to atmospheric temperature, following which the cakes or tablets 6, still disposed in a pile, with the separating disks 5 between them, may be placed in a carton having a cylindrical body 8, in which the pile fits, and having two removable end caps 9, such cartons providing the container in which the cakes or tablets are stored or marketed.

The gelatine in the composition serves as a binder, or as an adhesive material, for holding the coffee particles firmly attached to each other. It also adds food value to the composition and seals in the flavor of the coffee.

The egg white serves its usual function in clarifying the coffee and adding to the food value and flavor, and it also serves as an adhesive for binding together the particles of coffee and for sealing in the cake or tablet the flavor of the coffee.

The salt adds to the flavor and also serves as a preservative and to eliminate the bitter taste usually present when coffee is boiled for a considerable length of time as it should be to extract its full strength.

The salt also serves in the tablet or cake to prevent staining of the cloth container when the cake or tablet is boiled in such a container.

The glucose serves as an adhesive, adds food value and a sweet taste, when the latter is desired, otherwise the glucose may be omitted. If desired it may also be substituted for the gelatine, as it affords the functions of the latter with the additional of adding sweetness to the composition. If the latter is not desired, the gelatine should be used and the glucose eliminated.

The baking of the compressed cake, formed of ground browned coffee and containing egg white, or other suitable adhesive material, produces a marketable product, which is hard and firm, and in which the elements thereof are so tenaciously held together that the cakes can be roughly handled and shipped or stored without breaking or crumbling, even when subjected to boiling in the coffee pot.

The adhesive material used to hold together the grains of the coffee cake should have the qualities of being made to adhere to the coffee grains and to harden when subjected to the high heat of the baking operation, so as to produce a coffee cake that is hard, dense and impermeable to the air, and which will reach the user in integral form.

The adhesive material used should also be of a nature that it will permit the coffee cake to expand and become porous, when the cake is subjected to boiling water in the coffee pot, so that the water can combine with the coffee extract to produce liquid coffee.

Egg white, gelatine, glucose and the adhesive material which the coffee grains possess, have the qualities just referred to, which adapt them to serve as binders for the coffee grains. Of these materials egg white, when baked, has the greatest cementing strength, but each of them, after the baking operation, will retain the cake in integral form, and enable it to withstand, without crumbling or breaking, reasonable rough usage to which it may be subjected in handling and shipment before it reaches the user.

Either of the four adhesive materials may be employed as a binder for the cake grains, either alone, or with any or all of the others. A baked cake of coffee alone, while not as strong as with the addition of egg white, is a marketable product that will successfully withstand the handling required to get it to the user's hands. With the egg white added, however, the coffee will be clearer, will have the flavor imparted to it by the egg white, and the cake will hold together in the coffee pot or percolator during the boiling operation, due to the egg white being, when baked, insoluble to any great extent in boiling water, while the other three adhesive materials are soluble in boiling water.

When the formed cake is, in the baking operation, subjected to intense heat for a prolonged time, the adhesive material of the coffee grains, and any of the other adhesive materials named, if such are present, will adhere to the grains, become hardened by the heat, and will firmly hold the grains together. When the cake so baked is placed in boiling water, the heat of the water will expand and make porous the cake, so that its interior is accessible to the boiling water.

As my improved coffee cake or tablet may be boiled for a considerable period of time without the usual bitter taste usually caused by boiling coffee being present, the full strength of the coffee can be extracted, thereby effecting a great saving in the coffee used for a given number of cups.

I do not limit my invention to precise steps and proportions other than as set forth in the appended claims, as modifications, within the scope of the claims, may be made without departing from the spirit of my invention.

What I claim is:—

1. The process of making a coffee cake adaptable for making coffee, consisting in forming into a cake ground browned coffee, and then baking the cake until the adhesive material of the coffee grains unites and hardens, thereby making an integral body of the grains and adhesive material.

2. The process of making a coffee cake adapted for use in making coffee, consisting in forming into a compressed cake ground browned coffee, and then baking the cake, while holding it compressed, until the adhesive material of the coffee grains unites and hardens, thereby making an integral body of the grains and adhesive material.

3. The process of making a coffee cake adapted for use in making coffee, consisting in forming into a cake ground browned coffee and adhesive material which hardens by baking and holds together the coffee grains and permits the cake to expand when subjected to boiling water, and then baking the cake until the adhesive material hardens and makes an integral body of the grains and the adhesive material.

4. The process of making a coffee cake adapted for use in making coffee, consisting in forming into a compressed cake ground browned coffee and adhesive material which hardens in baking and holds together the coffee grains and permits the cake to expand when subjected to boiling water, and then baking the compressed cake, while holding it compressed, until the adhesive material hardens and makes an integral body of the grains and adhesive material.

5. The process of making a coffee cake adapted for use in making coffee, consisting in forming into a cake ground browned coffee and egg white, and then baking the cake until the egg white hardens and makes an integral body of the coffee grains and egg white.

6. The process of making a coffee cake adapted for use in making coffee, consisting in forming into a compressed cake ground browned coffee and egg white, and then baking the compressed cake, while holding it compressed, until the egg white hardens and makes an integral body of the coffee grains and egg white.

7. A coffee cake adapted for use in making coffee comprising a baked cake of ground browned coffee and adhesive material integrally united with and holding the coffee grains together and which will permit the cake to expand when subjected to boiling water.

8. A coffee cake adapted for use in making coffee comprising a baked cake of ground browned coffee and hardened egg white integrally united with and holding together the coffee grains.

In testimony whereof I have signed my name to this specification.

JOHN PETER PAULY.